3,127,414
PREPARATION OF m-PHENYLENEDIMALEIMIDE
Halbert N. Cole, Claymont, and Wilhelm F. Gruber, Wilmington, Del., assignors to E. I. du Pont de Nemours and Company, Wilmington, Del., a corporation of Delaware
No Drawing. Filed Jan. 12, 1962, Ser. No. 165,947
6 Claims. (Cl. 260—326.3)

This invention relates to an improved process for the preparation of an N,N'-aryldimaleimide.

A general method for the preparation of N-arylmaleimides is disclosed in U.S. 2,444,536. The process described in this patent is not entirely satisfactory for the production of dimaleimides on a commercial scale, and it would, therefore, be desirable to provide an improved procedure. The compound, N,N'-m-phenylenedimaleimide is useful as a curing agent for elastomers. See, for example, the following U.S. patents: 2,906,738; 2,925,407; 2,965,553; and 2,958,672.

It is an object of this invention to provide a process for the manufacture of N,N'-m-phenylenedimaleimide whereby a product of improved purity and physical form is obtained in good yields. It is a further object to provide reaction media which lead to the formation of the product in a more desirable state. Other objects appear hereinafter.

These and other objects are accomplished when the reaction which produces N,N'-m-phenylenedimaleimide is performed in a suitable organic solvent. More particularly, the objects of this invention are achieved by the process which comprises reacting N,N'-m-phenylenedimaleamic acid with at least a stoichiometric amount of acetic anhydride in the presence of at least 0.12 mole of sodium acetate per mole of N,N'-m-phenylenedimaleamic acid, with the proviso that the reaction is carried out at a temperature of about 45° C. to about 60° C. in a polar organic solvent which is liquid at the reaction temperature at atmospheric pressure, which solvent is a lower aliphatic amide, a lower alkyl sulfoxide, or a lower aliphatic ketone. Upon cooling of the reaction mixture, a product which is crystalline and readily isolatable is obtained.

By the process of this invention, N,N'-m-phenylenedimaleamic acid, acetic anhydride, and anhydrous sodium acetate are mixed with a solvent of the above group and are heated to 45 to 50° C. Heat of reaction then carries the temperature beyond 50° C., and cooling is applied in order to maintain the temperature within the range of about 45° C. to about 60° C. If temperatures above 60° C. are used, the product is obtained in a less pure form. At temperatures below 45° C., the reaction proceeds too slowly to be practical.

Although a reaction time of about an hour within the prescribed temperature range is usually required, the reaction may be allowed to continue for as long as heat is evolved. It is convenient to carry out the reaction at atmospheric pressure, although higher or lower pressures may be used if desired.

After the reaction is completed, the reaction mixture is cooled towards room temperature. As the reaction mixture cools, the products begins to appear as well-formed needle-like, bright yellow crystals. Crystallization of the product can be completed by the drop-wise addition of water.

The product can then be removed by filtration and washed with water until it is acid free. After drying, the product is sufficiently pure for use in curing elastomers. If desired, the product may be further purified by known methods, for example, by recrystallization.

At least a stoichiometric amount of acetic anhydride should be used in carrying out the process of this invention. The stoichiometric amount in this reaction is two moles of acetic anhydride per mole of the N,N'-m-phenylenedimaleamic acid. In order to promote complete reaction of the phenylenedimaleamic acid, it is preferred to use an excess of the acetic anhydride. The preferred proportions are 2.1 to 2.5 moles of acetic anhydride per mole of the phenylenedimaleamic acid.

At least 0.12 mole of anhydrous sodium acetate per mole of the phenylenedimaleamic acid should be used. If less than 0.12 part is used, the reaction rate becomes excessively slow. More than 0.20 part will not normally be required, although more may be used is desired.

The solvents to be used in practicing this invention are polar organic solvents which are liquid at 45 to 60° C. at atmospheric pressure. Usable solvents include lower alkyl sulfoxides and lower aliphatic ketones. Also applicable are lower aliphatic carboxamides or an N-lower alkyl or N,N-lower dialkyl derivative of either in accordance with the formula

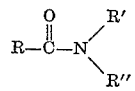

in which R, R', and R" are independently selected from the group consisting of hydrogen and lower alkyl. Examples of suitable solvents are formamide, N,N-dimethylformamide, N,N-diethylformamide, N-ethylacetamide, methyl sulfoxide, ethyl sulfoxide, acetone, methyl ethyl ketone, and diethyl ketone. The quantity of solvent is not critical except that a sufficient amount should be used to provide a satisfactory reaction medium and to keep the reaction medium from becoming too viscous during the course of the reaction.

The following examples are illustrative of the invention. Parts are by weight unless otherwise indicated.

*Example 1*

A mixture of 304 parts (1 mole) of N,N'-m-phenylenedimaleamic acid, 614 parts of N,N-dimethylformamide, 250 parts (2.45 moles) of acetic anhydride, and 15 parts (0.183 mole) of anhydrous sodium acetate is heated with stirring. When the temperature reaches about 52° C. the reaction mixture becomes a clear, bright yellow solution. The heat of reaction carries the temperature to 55° C. at which point sufficient cooling is provided to maintain the reaction mixture at 55±2° C. for a period of one hour. The reaction mixture is cooled to room temperature, and 650 parts of water is added slowly over a half-hour period with stirring. The resulting yellow crystalline precipitate is filtered, washed to neutrality with water, and dried in a vacuum oven at 60° C. The product, N,N'-m-phenylenedimaleimide, in the form of bright yellow crystals, is obtained in 80% yield (214 parts are obtained). The melting point is 202.4–205.2° C.

*Example 2*

The procedure of Example 1 is followed using 615 parts of N,N-dimethylacetamide instead of the dimethylformamide. The yield is 79% (211 parts of product) of N,N'-m-phenylenedimaleimide having a melting point of 197–203° C.

*Example 3*

The procedure of Example 1 is followed using 810 parts of methyl sulfoxide as the solvent instead of dimethylformamide. The product is watered out using 800 parts of water. The yield is 233 parts (87% of theory) of N,N'-m-phenylenedimaleimide melting at 199–205° C.

*Example 4*

A mixture of 304 parts of N,N'-m-phenylenedimaleamic acid, 1100 parts of acetone, 250 parts of acetic anhydride, and 15 parts of anhydrous sodium acetate are reacted at 50–60° C. for a period of one hour. The reaction mass remains a slurry instead of becoming a single phase solution. The reaction slurry thickens toward the end of the reaction. The reaction mass is cooled to room temperature, and an equal volume of water is added slowly over a half-hour period with stirring. The yellow crystalline precipitate which is obtained is filtered, washed to neutrality with water, and dried at 70° C. The yield is 214 parts (80% of theory) of N,N'-m-phenylenedimaleimide.

Many widely different embodiments of this invention may be made without departing from the spirit and scope thereof; it is to be understood that this invention is not limited to the specific embodiments thereof except as defined in the appended claims.

What is claimed is:

1. In the process which comprises contacting and reacting N,N'-m-phenylenedimaleamic acid with at least a stoichiometric amount of acetic anhydride in the presence of at least 0.12 mole of sodium acetate per mole of N,N'-m-phenylenedimaleamic acid and obtaining as a result thereof N,N'-m-phenylenedimaleimide, the improvement which comprises carrying out the reaction at a temperature within the range of about 45° C. to 60° C. in a polar organic solvent which is liquid at the reaction temperature at atmospheric pressure, wherein said solvent is selected from the group consisting of (a) a compound of the formula

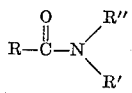

wherein R, R', and R" are each selected independently from the group consisting of hydrogen and lower alkyl, (b) lower alkyl sulfoxide, and
(c) lower aliphatic ketone.

2. In the process which comprises contacting and reacting N,N'-m-phenylenedimaleamic acid with at least a stoichiometric amount of acetic anhydride in the presence of from 0.12 to 0.20 mole of sodium acetate per mole of N,N'-m-phenylenedimaleamic acid and obtaining as a result thereof N,N'-m-phenylenedimaleimide, the improvement which comprises carrying out the reaction at a temperature within the range of 45° C. to 60° C. in a polar organic solvent which is liquid at the reaction temperature at atmospheric pressure, wherein said solvent is of the formula

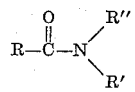

wherein R, R', and R" are each selected independently from the group consisting of hydrogen and lower alkyl.

3. In the process which comprises contacting and reacting N,N'-m-phenylenedimaleamic acid with at least a stoichiometric amount of acetic anhydride in the presence of from 0.12 to 0.20 mole of sodium acetate per mole of N,N'-m-phenylenedimaleamic acid and obtaining as a result thereof N,N'-m-phenylenedimaleimide, the improvement which comprises carrying out the reaction at a temperature within the range of 45° C. to 60° C. in a polar organic solvent which is liquid at the reaction temperature at atmospheric pressure, wherein said solvent is lower alkyl sulfoxide.

4. In the process which comprises contacting and reacting N,N'-m-phenylenedimaleamic acid with at least a stoichiometric amount of acetic anhydride in the presence of from 0.12 to 0.20 mole of sodium acetate per mole of N,N'-m-phenylenedimaleamic acid and obtaining as a result thereof N,N'-m-phenylenedimaleimide, the improvement which comprises carrying out the reaction at a temperature within the range of 45° C. to 60° C. in a lower aliphatic ketone selected from the group consisting of acetone, methyl ethyl ketone, and diethyl ketone.

5. In the process which comprises contacting and reacting N,N'-m-phenylenedimaleamic acid with at least a stoichiometric amount of acetic anhydride in the presence of from 0.12 to 0.20 mole of sodium acetate per mole of N,N'-m-phenylenedimaleamic acid and obtaining as a result thereof N,N'-m-phenylenedimaleimide, the improvement which comprises carrying out the reaction at a temperature within the range of 45° C. to 60° C. in N,N-dimethylformamide.

6. In the process which comprises contacting and reacting N,N'-m-phenylenedimaleamic acid with at least a stoichiometric amount of acetic anhydride in the presence of from 0.12 to 0.20 mole of sodium acetate per mole of N,N'-m-phenylenedimaleamic acid and obtaining as a result thereof N,N'-m-phenylenedimaleimide, the improvement which comprises carrying out the reaction at a temperature within the range of 45° C. to 60° C in methyl sulfoxide.

References Cited in the file of this patent

UNITED STATES PATENTS 2,444,536    Searle _____ July 6, 1948